Patented Feb. 13, 1945

UNITED STATES PATENT OFFICE 2,369,443

SURFACE-ACTIVE AGENTS

Joseph B. Dickey and Anthony Loria, Rochester, N. Y., assignors to Eastman Kodak Company, Rochester, N. Y., a corporation of New Jersey No Drawing. Application December 4, 1943, Serial No. 512,966

1 Claim. (Cl. 260—457)

This invention relates to the preparation and use of new organic compounds useful as surface-active agents and for related purposes and more particularly to sulfato derivatives of phosphonic acids having high chemical stability and inertness to hard water.

This application is a continuation-in-part of our copending allowed application, Ser. No. 407,066, filed August 15, 1941.

The principal object of the invention is the production of a new class of organic chemical compounds which are useful as surface-active agents such as wetting agents, dispersing or emulsifying agents, penetrating agents, detergents and the like. A further object is to provide compounds which are useful as textile lubricants and anti-statics. A still further object is to provide a new class of derivatives of phosphonic acid. Other objects will appear hereinafter.

We have found that sulfato derivatives of phosphonic acids having the following graphic formulae (I)
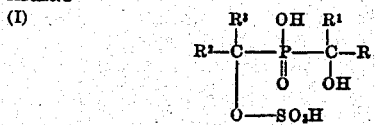

and
(II)
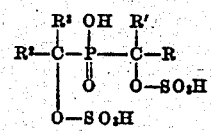

where R, $R^1$, $R^2$ and $R^3$ are groups selected from hydrogen, aryl, naphthenyl and alkyl, may be prepared by reacting phosphonic acids, having the graphic formula

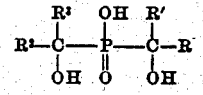

with a sulfating agent such as sulfuric acid, oleum, sulfurtrioxide, sulfuryl chloride, chlorosulfonic acid, sodium chlorosulfonate, or the like.

The products of this invention give calcium and magnesium salts which are sufficiently soluble in water to enable one to use these compounds in hard water without the formation of the objectionable precipitates obtained with soap. Because of this property, many of the products of this invention are valuable for many household purposes, such as the cleansing of cloth, dishes, and the like. The products of this invention can also be used to advantage for practically any purpose where a "surface-active" compound is needed, for example, as dispersing, wetting, emulsifying agents, as textile assistants and dye-dispersing agents. Such compounds are of outstanding value for the lubrication and anti-static treatment of textile yarns, threads and fibers, particularly those composed of or containing lower aliphatic acid esters of cellulose such as cellulose acetate, cellulose propionate, cellulose acetate propionate and cellulose acetate butyrate. Many of these compounds are solvents for or soluble in mineral oils and in naturally-occurring blown or unblown animal and vegetable oils such as neatsfoot, olive, castor, soybean, sperm, egg and teaseed oils.

In the following examples and description we have set forth several of the preferred embodiments of our invention, but they are included merely for purposes of illustration and not as a limitation thereof.

PREPARATION OF INTERMEDIATES

The intermediates, that is, the acids from which the sulfato derivatives are obtained, may be prepared by the procedure set forth in Compt. rend. 134, 847; 133, 219; 136, 234, 509 and Ann. chem. phys. (8) 3, 347; Text Book of Organic Chemistry, vol. XI, part III, chapter 1, page 41, by J. N. Friend.

Among the intermediates useful for preparation of the sulfato derivatives of our invention are the following compounds, the description and preparation of which are indicated in each instance.

1. Bis-α-hydroxybenzylhypophosphorous acid.
Ann. Chem. phys.; (6) 23; 293, p. 289

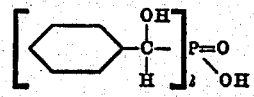

2. Bis-α-hydroxyheptanehypophosphorous acid.  Ibid., p. 311

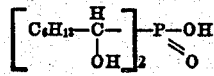

3. Bis-α-hydroxypentanehypophosphorous acid.  Ibid., p. 325

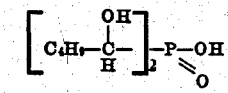

4. Bis-α-hydroxybutanehypophosphorous acid.  Ibid., p. 343

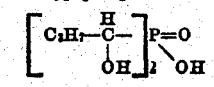

5. Bis-α-γ-hydroxybutanehypophosphorous acid.  Ibid., p. 343

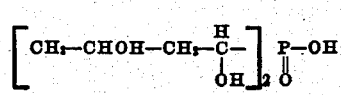

6. Bis-α-hydroxyiso-propylhypophosphorous acid.
Ann. Chem. phys. (8) 3, p. 347

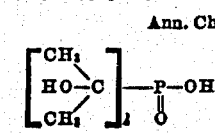

7. α-Hydroxybenzylhydroxymethylhypophosphinic acid.
Ibid., p. 417

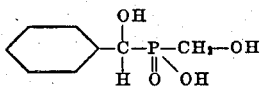

8. α-Hydroxybenzyl-α-hydroxyiso-propylhypophosphinic acid.
Ibid., p. 419

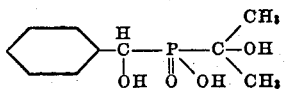

9. α-Hydroxyheptyl-α-hydroxyiso-propylhypophosphinic acid.
Ibid., p. 420

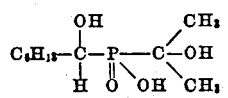

10. α-Hydroxyisoamyl-α-hydroxybenzylhypophosphinic acid.
Ibid., p. 423

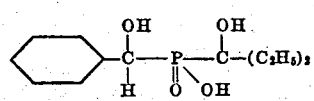

11. α-Hydroxybenzyl-β-hydroxybutylhypophosphinic acid.
Ibid., p. 424

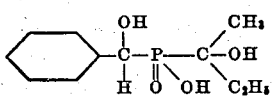

12. α-Hydroxyheptyl-α-hydroxy-iso-butylhypophosphinic acid.
Compt. rend., 138, p. 1708

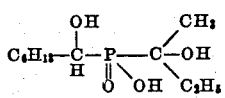

13. α-Hydroxyethyl-α-hydroxymethylbenzylhypophosphinic acid.
Ibid., p. 138, 1708

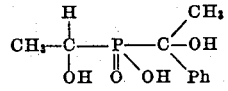

14. β-α-Hydroxyamyl-α-hydroxybenzylhypophosphinic acid. Ibid.

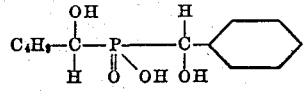

15. α-Hydroxy-iso-propyl-α-hydroxyethylphosphinic acid. Ibid.

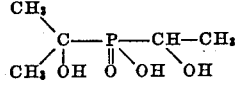

Synthesis of New Intermediates

In addition to the above known compounds, we have prepared a number of additional acids of this general type. The following examples describe the preparation and general characteristics of a number of these compounds.

Example 1

66 g. (1.0 mole) of hypophosphorous acid and 5 moles of mixed xylylpalmitylstearyl ketones are heated under carbon dioxide for two weeks at 100–105°. On cooling, a solid separates that is filtered, washed with dilute alcohol, and dried. The compound has the formula:

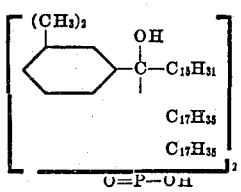

It is soluble in petroleum ether, acetic acid, and alcohol, and insoluble in water.

Example 2—Bis-α-hydroxynaphthenylhypophosphinous acid 6 moles dinaphthenyl ketone and (1.0 mole) 66 g. hypophosphorous acid are heated at 95–105° for two weeks and worked up as above. The product thus obtained is a colorless mass, insoluble in water, and having the general solubility properties given above. The compound has the formula:

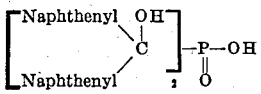

Example 3—Bis-α-hydroxy-p-xenylamylhypophosphorous acid

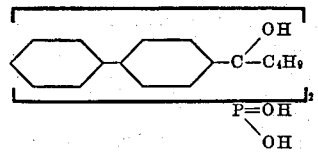

66 g. (1.0 mole) hypophosphorous acid and 6 moles p-xenylbutylketone are reacted and worked up exactly as in Example 2. The product has the same general solubility properties as in that example.

Example 4—Bis-α-hydroxymethylamylhypophosphorous acid

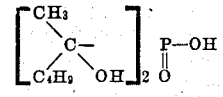

66 g. (1.0 mole) hypophosphorous acid are heated on a steam bath with 10 moles methylbutylketone for 10 days. The ketone is removed under reduced pressure, and the product is dissolved in alkali and reprecipitated several times. It is soluble in the common organic solvents.

Example 5—α-Hydroxy-α-naphthenylethyl-α-hydroxymethylamylhypophosphorous acid 66 g. (1.0 mole) hypophosphorous acid and 1.0 mole methylbutylketone are warmed on a steam bath for 20 hours; then 5 moles of methylnaphthenylketone are added and heated at 95–105° for two weeks. The acid is extracted with alkali and precipitated by adding acid. It has the general solubility properties previously described and the formula:

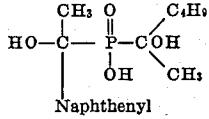

Example 6—α-Hydroxyhexadecyl-α-hydroxymethylpropylhypophosphorous acid

One mole of hexadecylaldehyde is reacted with 66 g. (1.0 mole) hypophosphorous acid at 95° for 10 hours; then 6 moles methylethylketone are added and the reaction continued and the product worked up as in Example 1.

The compound has the formula:

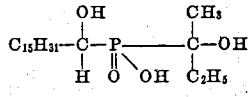

In general, the naphthenyl derivatives are prepared as described in U. S. 2,256,112. From the above examples, it is seen that the preparation of the hypophosphorous acids presents no special difficulties. Compounds of these general types may be reacted with organic acid halides or anhydrides to give the monoacyl esters having the general formula:

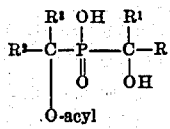
O-acyl

These are sulfated to give

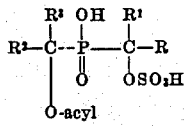
O-acyl

PREPARATION OF THE SULFATO DERIVATIVES

The preparation of the sulfato derivatives of our invention by reacting acids of the type above described with a sulfating agent is given below:

*Example 7—Mono-α-sulfato-α-hydroxybisheptanehypophosphorous acid*

One mole of bis-α-hydroxyheptanehypophosphorous acid is placed in a flask fitted with a stirrer, dropping funnel, and thermometer with 500 cc. carbon tetrachloride. Then 1.1 moles of freshly distilled chlorosulfonic acid are added dropwise with stirring at room temperature over a period of one hour. The reaction mixture is slowly warmed to 90° on a steam bath to complete the reaction. The carbon tetrachloride is distilled off, and the product is evacuated under reduced pressure to remove the last of the product. It is a heavy, water soluble oil. The compound has the formula:

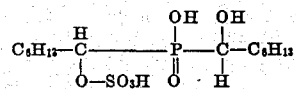

If about 2.2 moles chlorosulfonic acid are used, the α, α disulfato compound:

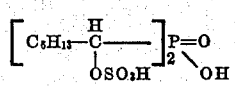

is obtained.

*Example 8—Bis-α-sulfatomethylhexylhypophosphorous acid*

One mole of bis-α-hydroxymethylamylhypophosphorous acid is reacted exactly as in Example 7 with 2.2 moles freshly distilled chlorosulfonic acid. It is worked up exactly as in Example 1 and is a colorless water soluble acid having the formula:

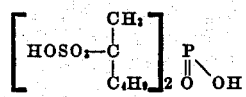

If in place of 2.2 moles chlorosulfonic acid 1.1 moles had been used, the mono-sulfato compound would have been obtained as in Example 7.

*Example 9—Bis-α-sulfatoheptanehypophosphorous acid*

One mole of bis-α-hydroxybutanehypophosphorous acid is reacted at 0° with 2.2 moles of chlorosulfonic acid dropwise with stirring. The reaction is completed and worked up as in Example 7. It is a colorless water soluble compound having the formula:

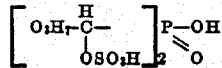

*Example 10—Bis-α-sulfato-iso-propylhypophosphorous acid*

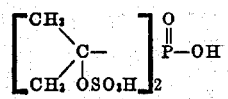

One mole of bis-α-hydroxy-iso-propylhypophosphorous acid and 1 liter of chloroform are stirred at 15°, and 2.2 moles chlorosulfonic acid are added dropwise over a period of two hours. The reaction is completed by warming on a steam bath for one hour, and the product is worked up as in example. It is colorless and water soluble and can be hydrolyzed by warming with dilute hydrochlorid acid. By using 1.1 moles chlorosulfonic acid, the monosulfato compound is produced.

*Example 11—α-Sulfatoheptyl-α-sulfato-iso-propylhypophosphorous acid*

One mole of α-hydroxyheptyl-α-hydroxy-iso-propylhypophosphorous acid is sulfated exactly as in Example 7. The water soluble product has the formula:

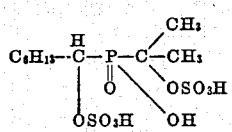

By using 1.1 moles chlorosulfonic acid, the water soluble monosulfato compound is obtained.

*Example 12—α-Sulfatoethyl-α-hydroxymethylbenzylhypophosphorous acid*

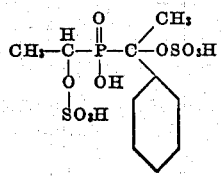

One mole of α-hydroxyethyl-α-hydroxymethylbenzylhypophosphorous acid is sulfated exactly as in Example 7. The product is water soluble. By using oleum in excess at room temperature and slowly warming to 100°, a sulfonic acid group is introduced into the aromatic ring. Ice is added, and the compound

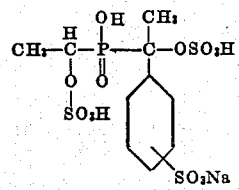

Example 13

One mole of the compound

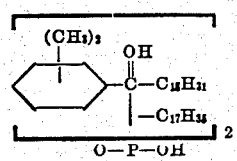

in 1 liter of carbon tetrachloride reacted with 2.2 moles chlorosulfonic acid and worked up after reacting as in Example 7 by removing the carbon tetrachloride and washing with water. The product has the formula

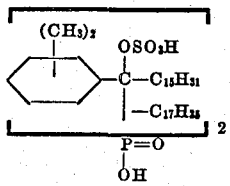

and is slightly soluble in water. By using 1.1 moles chlorosulfonic acid, the monosulfato compound is obtained. The benzene ring may be sulfonated as in Example 12.

*Example 14—Bis-α-sulfatonaphthenylhypophosphorous acid*

1 mole of bis-α-hydroxynaphthenylhypophosphorous acid and 2.2 moles chlorosulfonic acid are reacted and worked up as in Example 7. The water soluble product has the formula:

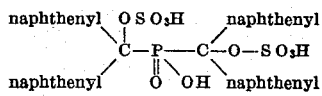

The monosulfato compound is obtained by using 1.1 moles chlorosulfonic acid.

*Example 15—Bis-α-sulfato-p-xenylamylhypophosphorous acid*

One mole of bis-α-sulfato-p-xenylamylhypophosphorous acid is sulfated with 2.2 moles chlorosulfonic acid and worked up as previously described. The water soluble product has the formula:

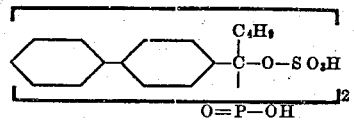

The monosulfato is prepared in the usual manner. The aromatic ring can be sulfonated as in Example 12.

*Example 16—α-Sulfato-α-naphthenylethyl-α-sulfatomethylamyl-hypophosphorous acid*

One mole of α-hydroxy-α-naphthenylethyl-α-hydroxymethylamylhypophosphorous acid is sulfated exactly as in Example 7 and worked up as therein described. The colorless water soluble product has the formula:

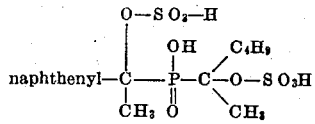

By using one mole of chlorosulfonic acid, the mono ester is obtained.

*Example 17—Bis-α-sulfato-naphthenyl (mixed) (diethyl) phenylhypophosphorous acid*

One mole of bis-α-hydroxynaphthenyl (mixed diethyl) phenylhypophosphorous acid is sulfated with 2.2 moles chlorosulfonic acid exactly as in Example 7 and worked up as therein described. The water soluble product that results has the formula:

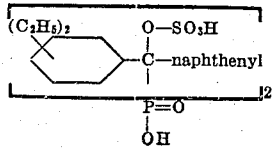

The monosulfato compound is prepared in the usual manner.

*Example 18—α-Sulfatoamyl-α-acetoxyamylhypophosphoric acid*

One mole of bis-α-hydroxyamylhypophosphorous acid is warmed on a steam bath with 1.1 moles acetic anhydride for 10 hours. The acetic acid and anhydride are removed under reduced pressure. The resulting water soluble product has the formula:

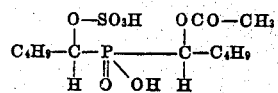

*Example 19*

One mole of α-sulfato-sec-butyl-α-hydroxy-sec-butyl-hypophosphorous acid and 1 mole palmityl chloride are digested on the steam bath until no more hydrogen chloride escapes. The product is washed with water and dried. It is α-sulfato-sec-butyl-α-palmitoxysecbutylhypophosphorous acid and has the formula:

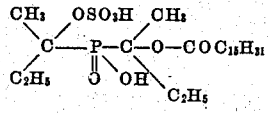

Any acid anhydride such as propionic, methoxy acetic, sulfo acetic, benozic, heptoic, oleic, borezoic, naphthenic, and the like, and any of the acid chlorides such as benzoyl, palmityl, naphthenyl, oleyl, bateryl, etc., may be used.

The compositions of our invention are especially useful as textile lubricants and anti-statics for the conditioning of textile yarns, threads and fibers, particularly those composed of or containing organic derivatives of cellulose such as cellulose acetate, cellulose propionate, cellulose butyrate, cellulose acetate propionate and cellulose acetate butyrate to render such materials amenable to various textile operations including knitting, weaving, spinning, carding, twisting and the like.

In addition to the above-mentioned uses, the compounds of our invention are especially effective as detergents for washing textiles, china ware, cooking utensils and the like. These compounds may also be employed in place of ordinary soaps for shampooing, shaving and similar applications as well as in tooth paste and other preparations of like character. Their value for these purposes is primarily due to their inertness to hard water and to their chemical stability. Not only may these materials be employed alone, but they may also be employed as an adjunct to other detergent and surface-active agents for many industrial and domestic uses.

What we claim is:

As new chemical compounds sulfato derivatives of α, α' hydroxy phosphonic acids having the structural formula:

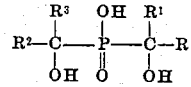

wherein R, $R^1$, $R^2$ and $R^3$ are substituents selected from the group consisting of hydrogen, aryl, naphthenyl and alkyl.

JOSEPH B. DICKEY.
ANTHONY LORIA.